United States Patent
Toledo et al.

(10) Patent No.: US 11,666,054 B2
(45) Date of Patent: Jun. 6, 2023

(54) **HIGH-LOAD GLYPHOSATE HERBICIDAL COMPOSITION, READY-TO-USE FORMULATION OBTAINED FROM THE COMPOSITION AND METHOD TO CONTROL VARIOUS *WEED* SPECIES IN AGRICULTURAL CROPS**

(71) Applicant: OURO FINO QUÍMICA LTDA., Uberaba (BR)

(72) Inventors: Roberto Toledo, Ribeirão Preto (BR); Edson Mattos, Jaboticabal (BR); Thais Oliveira, Ribeirão Preto (BR); Luciano Galera, Jardim California (BR)

(73) Assignee: OURO FINO QUÍMICA S/A, Uberaba (BR)

( * ) Notice: Subject to any disclaimer, the term of this patent is extended or adjusted under 35 U.S.C. 154(b) by 55 days.

(21) Appl. No.: 16/978,652

(22) PCT Filed: Mar. 1, 2019

(86) PCT No.: PCT/BR2019/050066
§ 371 (c)(1),
(2) Date: Sep. 4, 2020

(87) PCT Pub. No.: WO2019/169465
PCT Pub. Date: Sep. 12, 2019

(65) Prior Publication Data
US 2020/0404922 A1    Dec. 31, 2020

(30) Foreign Application Priority Data

Mar. 9, 2018  (BR) .................. 102018004761 2

(51) Int. Cl.
*A01N 57/20* (2006.01)
*A01N 25/30* (2006.01)
*A01N 25/12* (2006.01)
*A01N 25/02* (2006.01)

(52) U.S. Cl.
CPC ............. *A01N 57/20* (2013.01); *A01N 25/30* (2013.01)

(58) Field of Classification Search
CPC ......... A01N 57/20; A01N 25/30; A01N 25/12
See application file for complete search history.

(56) References Cited

U.S. PATENT DOCUMENTS

| | | |
|---|---|---|
| 6,871,707 B2 | 3/2005 | Karanikas et al. |
| 6,908,882 B1 | 6/2005 | Becher et al. |
| 2002/0065199 A1 | 5/2002 | Wright |
| 2003/0087764 A1 | 5/2003 | Pallas et al. |
| 2003/0104943 A1 | 6/2003 | Lennon et al. |
| 2006/0040826 A1 | 2/2006 | Eaton et al. |
| 2006/0240985 A1 | 10/2006 | Moreno |
| 2009/0215626 A1 | 8/2009 | Elsik et al. |
| 2012/0231956 A1 | 9/2012 | Rainbird |
| 2013/0172184 A1* | 7/2013 | Bain ............... A01N 59/16 504/100 |
| 2015/0164083 A1 | 6/2015 | Castelani et al. |
| 2017/0339949 A1* | 11/2017 | Klug ............... A01N 41/10 |

FOREIGN PATENT DOCUMENTS

| | | |
|---|---|---|
| WO | 02069718 A2 | 9/2002 |
| WO | 02/096199 A2 | 12/2002 |

OTHER PUBLICATIONS

International Search Report and Written Opinion issued in the corresponding Application No. PCT/BR2019/050066 dated May 10, 2019.
International Preliminary Report on Patentability issued in the corresponding Application No. PCT/BR2019/050066 dated Feb. 21, 2020.

* cited by examiner

*Primary Examiner* — Mina Haghighatian
(74) *Attorney, Agent, or Firm* — Ditthavong, Steiner & Mlotkowski

(57) ABSTRACT

Presently disclosed is a high load glyphosate herbicidal composition with high efficiency and low toxicity. The composition includes glyphosate as a mixture of potassium salts and glyphosate salt with monoisopropylamine (MIPA) of a glyphosate (acid equivalent) load of 400 to 600 g/L in balance with a surfactant system formed by an oxidized amine, an aliphatic alcohol, and a complexing agent, for the control of weeds in agricultural crops. The composition further includes adjuvants which promote a significantly more advantageous herbicidal efficacy than other known glyphosate formulations.

23 Claims, 2 Drawing Sheets

HIGH-LOAD GLYPHOSATE HERBICIDAL COMPOSITION, READY-TO-USE FORMULATION OBTAINED FROM THE COMPOSITION AND METHOD TO CONTROL VARIOUS *WEED* SPECIES IN AGRICULTURAL CROPS

FIELD OF INVENTION

This invention relates to a high concentration glyphosate herbicidal composition, comprising the use of a surfactant system in association with different high-load glyphosate salts. In particular, the invention relates to high-load glyphosate compositions that exhibit greater ease of herbicide penetration into the leaf, greater absorption and translocation of glyphosate in the target weeds to be controlled.

The main object of the present invention is to provide a composition that promotes the increase of the concentration of the glyphosate herbicide to be applied to the plants so that in addition to its effective herbicidal effect, and a higher rate of control action is also presented with the objective of reducing possible losses of glyphosate due to washing by rainwater after the application, thus reducing the environmental impact potential, in addition to minimizing transport, storage and, especially, packaging disposal costs, when compared to other commercial glyphosate formulations in the market.

More specifically, combinations of a surfactant system comprising an oxidized amine, an aliphatic alcohol and a complexing agent have been explored for use in herbicidal formulations comprising high-load glyphosate salts and, in order to increase the concentration of the herbicide glyphosate, i.e., to improve its effectiveness and dynamics in the plants regarding the control of different weeds, as in *brachiaria* grass. However, the present invention, in spite of the increased concentration of glyphosate in plants, does not compromise the efficacy, selectivity of soy, maize and cotton crops, among other crops, in addition to promoting greater safety for farmers, consumers and the environment.

More specifically, the components of the composition of the present invention are presented in suitably balanced ratios leading to greater agronomic efficacy in weed management in different production environments as well as selectivity to transgenic soybean, maize and cotton, thus contributing to the preservation of the productive potential of these crops.

Additionally, the composition of the present invention also shows low toxicity to man and the environment, in addition to providing low production cost.

The present invention also relates to a herbicidal composition which is provided ready to be dispensed into a tank, where it is transformed into a liquid solution suitable for spraying in the field.

More specifically still, the present invention is also characterized in that it can provide herbicidal formulations in various physical forms, for example in the form of a solid particulate product, such as a powder or granular composition, and more specifically such as dispersible granules (WG).

Likewise, and more preferably the composition may be in the form of a concentrated solution formulation containing high-load glyphosate, having its components suitably balanced, therein including the use of a surfactant system. As a concentrated aqueous solution, it is expected that there will be variation of the glyphosate dynamics in the plants regarding the control of the different weed species, such as *brachiaria* grass.

However, in spite of the increased glyphosate concentration in plants, depending on the various specific types of use, which vary in turn depending on the treatments and cultures for which the formulations are being used, the present invention does not compromise the efficacy, selectivity of soybean, maize and cotton, among other crops, as well as promotes greater safety for farmers, consumers and the environment. Said formulations are intended to facilitate herbicide penetration and herbicide absorption in leaves and translocation of glyphosate through the weeds to be controlled.

In a further embodiment, the invention provides a method to control different weeds and/or undesired vegetation in different crops, including glyphosate resistant plants, which comprises promoting the proper application of the different formulations from the herbicidal composition of the present innovation on the plantation under treatment.

INVENTION BACKGROUND

Glyphosate is the most widely used herbicide in the world. It has an essential role in the agricultural production of grains based on the use of no-till or minimum cultivation. Even after the development of resistance in several weed species, glyphosate has been shown to be indispensable in desiccation applications in pre-planting in annual and perennial crops; in directed applications in perennial crops; in total area applications in crops genetically modified to tolerate the herbicide (e.g., soybean, maize and cotton).

Glyphosate is a very weak acid and can suffer up to three ionizations. It is strongly absorbed and quickly degraded in soils. Its activity occurs only when it is applied on the leaves of plants. It is a non-selective herbicide and can control weeds of different botanical groups. It is slightly toxic and rapidly excreted by animals. It has as one of its main characteristics the capacity of translocation by the phloem, the conductive system of the plants that transports photoassimilates from the producing regions to the consuming regions of the plants. Its action site is the enzyme 5-enolpyruvate-chiquimate-3-phosphate synthase (EPSPs), involved in the production of aromatic amino acids.

In this sense, obtaining compositions that allow higher levels of deposition, penetration and absorption of glyphosate, as well as its salts is of great interest, to provide a treatment with lower losses, such as by washing by rainwater and lower contamination potential environmental performance, and greater weed control.

The state of the art already presents several studies carried out with different types of salts of glyphosate (monoisopropylamine salt (MIPA), ammonium salt and potassium salt), as well as by the association between two or more types of salts and the respective concentrations and proportions between them.

The proper choice of glyphosate salts to be employed in association with each other and with an efficient and compatible surfactant system, as well as more precise proportionality among them, has been found by the investigators of the present invention to be the most appropriate solution to allow even genetically modified crops to resist the glyphosate herbicide, solve the persistent problem of such crops being damaged by glyphosate applications.

From the combinations of the present invention, better control results of the different weeds competing with the most diverse agricultural crops were achieved than those results already known in the prior art, for example those related to the use of a single glyphosate salt type.

As an example, WO02069718 discloses an aqueous concentrated composition of herbicide comprising glyphosate, a surfactant component and oxalic acid or a salt or ester thereof wherein: a) the glyphosate or a salt or ester thereof is in solution in a concentration that is biologically effective when the composition is diluted in an appropriate volume of water and applied to the foliage of a susceptible plant, b) a surfactant component is in solution or suspension, emulsion, or dispersion in the medium, and comprises one or more surfactants (tallowamine ethoxylated, phosphate ester, phosphate diester, etheramines and quaternary ammonium salts) and c) oxalic acid or a salt or ester. This document, however, does not anticipate or aim the obtaining of a composition, such as the present invention, containing a mixture of salts of glyphosate in high doses and in perfect balance of the salts of glyphosate among themselves, and between the surfactant system, promoting greater penetration and absorption in the leaf, and later greater glyphosate translocation in the weed, resulting in a greater speed and greater control effectiveness of these weeds.

A wide variety of typical formulations of glyphosate salts are described in the state of the art. Specifically for the mixture of isopropylammonium salt and potassium salt, there is, for example, U.S. Pat. No. 6,871,707 which relates to the glyphosate composition comprising potassium cations and isopropylammonium cations or monoethanolammonium cations or both. Preferably, the molar ratio of isopropyl ammonium to potassium cations is less than 30:1 and greater than 1:10, more preferably less than 15:1 and greater than 1:2.

According to this document, the glyphosate composition comprising in addition to potassium and isopropylammonium salts, or salts of monoethanolamine, or both, may also contain at least one surfactant, selected from: a) etheramine, b) ethoxylated aliphatic alcohols or acids, c) random copolymers of silicone or of ethylene oxide and propylene oxide and d) random block copolymers or copolymers of ethylene oxide or propylene oxide based on aliphatic alcohols, as well as a weed control method using this composition.

According to this document the composition is preferably in the form of solid particles. This document in turn does not anticipate a ready-to-use concentrated solution and is particularly characterized by the use of at least three (3) glyphosate salts, in addition to not suggesting or evidencing the use of a surfactant system.

The US2009215626 describes a composition in the form of an aqueous solution, which contains a glyphosate salt (isopropylamine salt, sodium salt and monoalkanolamine salt) in an amount greater than 480 g/L a.i.; b) a tallowamine alkoxylate; and c) an alkoxylate EDA (ethylenediamine alkoxy) and propylene oxide. More specifically, the compositions comprise: a) a glyphosate salt in an amount greater than 580 g/L a.i.; b) a tallowamine alkoxylate; and c) an alkoxylate EDA, wherein the composition has a cloud point above 90° C. Likewise, this priority does not anticipate the use of potassium glyphosate salt, nor the use of a surfactant system, as proposed in the present invention.

WO2006023431 describes a herbicidal composition characterized in that it comprises, in aqueous solution, a mixture of glyphosate salts under a total concentration of glyphosate acid equivalent of not less than 360 g/L, wherein: a) glyphosate is in anionic form, accompanied by non-amphiphilic cations of low molecular weight, in a total molar amount of 100% to 120% of the molar amount of glyphosate; b) the cations comprise potassium and propylammonium cations in a molar ratio of 70:30 to 90:10; and c) the potassium and propylammonium cations together constitute 90 to 100 mol % of all low molecular weight non-amphiphilic cations in the composition.

WO 2011057361 discloses a liquid formulation containing at least about 500 g/L or more of glyphosate, a surfactant which increases the efficacy of glyphosate and is compatible with potassium glyphosate and whose formulation content is less than 100 g/L, non-amphiphilic cations, most of which are potassium cations, a low molecular weight acid other than glyphosate and water.

Some surfactant systems have been used in glyphosate-based compositions and salts thereof, for example the one described in WO02096199 which discloses that the addition of diamines or other polyamines enhances the compatibility of ethereamine surfactants with pesticide formulations containing glyphosate or a salt or ester thereof.

Particularly, the document is directed to a composition of cationic surfactants for use in an aqueous pesticidal formulation comprising a first cationic surfactant and a second surfactant diamine or triamine. The cationic surfactant is selected from the group consisting of dialkoxylated amines or quaternary ammonium salts, quaternary ethoxylated alkyl amines, alkoxylated amino alcohols or their quaternary salts, ether or quaternary ammonium salts, alkoxylated poly (hydroxyalkyl) amines.

The diamine surfactant in said document is selected from the group consisting of diamines independently substituted with alkoxy, linear or branched alkyl, ether, substituted hydrocarbyl or hydrocarbyl substituents, or substituted hydrocarbylene or hydrocarbylene.

WO0117358 discloses a method for enhancing the herbicidal activity of a glyphosate herbicide which comprises adding to said herbicide a mixture of a first surfactant and a second surfactant in a weight ratio of total surfactant to glyphosate from about 1:30 to about 2:1, wherein the first surfactant has the following formula:

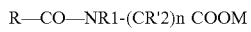

R—CO—NR1-(CR'2)n COOM

The second surfactant is selected from tertiary alkylamines and alkyl etheramines, polyoxyethylene tertiary alkylamines and alkyl ether amines, quaternary ammonium, pyridine and imidazoline surfactants, alkyl oxides and polyoxyethylene alkyl diamines.

Said compositions may be applied to a plant in a herbicidally effective amount, and may effectively control one or more plant species of one or more of the following genera without restriction: *Abutilon, Amaranthus, Artemisia, Asclepias, Avena, Axonopus, Borreria, Brachiaria, Brassica, Bromus, Chenopodium, Cirsium, Commelina, Convol20 vulus, Cynodon, Cyperus, Digitaria, Echinochloa, Eleusine, Elymus, Equisetum, Erodium, Helianthus, Imperata, Ipomoea, Kochia, Lolium, Malva, Oryza, Ottochloa, Panicum, Paspalum, Phalaris, Phragmites, Polygonum, Portulaca, Pteridium, Pueraria, Rubus, Salsola, Setaria, Sida, Sinapis, Sorghum, Triticum, Typha, Ulex, Xanthium* and *Zea*.

WO0189302 discloses a stable herbicide concentrate in storage that can be diluted with water to provide an herbicidal mixture for application to the foliage of a plant comprising glyphosate or a salt or ester thereof at the concentration of at least 500 g of acid/liter of glyphosate acid equivalent, and a surfactant component. According to said document, the surfactant component may comprise at least one surfactant selected from the group consisting of: monoalkoxylated amines, b) dialkoxylated amines, c) secondary or tertiary amines, d) dialkoxylated quaternary ammonium salts, e) ammonium salts quaternary monoalkoxylates, f) quaternary ammonium salts, g) diamines, h) alkoxylated alcohols, i) alkoxylated dialkylphenols and alkoxylated phosphates and a mixture thereof.

WO0030451 discloses a storage and shipping system for glyphosate herbicide, which comprises a vessel having a capacity of about 0.1 to about 100,000 liters or more, filled substantially with an aqueous solution of glyphosate, predominantly in the form of one or more of a mixture of potassium and monoethanolammonium salts thereof, the solution having a glyphosate acid equivalent concentration of at least about 30 percent in weight. Said system describes concentrated compositions of glyphosate, especially potassium salts, monoethanolammonium or mixtures thereof in a concentration based on glyphosate acid of between 30% (or 360 g/L) and a maximum percentage dictated by the solubility of the glyphosate salts present. The preferred surfactants used in said composition consists of: polyoxyethylene (5) cocoamide, N-cocoalkyl-N-methyl-N, N-diethanoammonium chloride and N-cocoalkyl-N, N-diethanolamine oxide.

As can be seen, prior art documents already disclose compositions of potassium salts and glyphosate isopropylammonium employing different surfactant systems, which are compatible with said salts, useful in controlling a very wide variety of plants all around the world.

However, to date no prior art document discloses a herbicidal composition formed of potassium salts and glyphosate isopropylammonium in a perfect balance with the surfactant system formed by an amine oxide, an aliphatic diol and a complexing agent as proposed in the present application and effective against one or more species of weeds of various families and genera, for example, the family Poaceae, of the genus *Brachiaria* and more particularly, the species *Brachiaria decumbens*, in addition to other weed species, such as, *Eleusine indica* and *Comelinea benghalensis*.

The surfactant system of the present invention may further be accompanied by other adjuvants, such as: antifoaming agents, promoters, activators, modifiers and/or additives, solvents, etc.

The species *B. decumbens* has become over the years an invading plant deserving great attention. In areas where *brachiaria* grass was introduced as forage, but with the subsequent transformation of these lands into crops, the plant becomes an important weed species, very aggressive and difficult to control.

According to Bianco et al. (2005), the invasion of *brachiaria* grass in sugarcane plantations causes serious problems, when it competes for environmental resources such as water, light and nutrients, acting as host of pests and common diseases and interfering with harvesting practices.

Besides the problems of competition with other crops, this species can also present allelopathic effect, as observed in *eucalyptus*, cotton, maize, rice, soybean and wheat crops.

We also highlight the relevance of *Brachiaria decumbens* as weeds in annual and perennial crops in practically all tropical regions where agriculture is practiced, especially in Brazil.

However, in crop management and in particular in sugarcane, soybean and rice crops its proper eradication and control is necessary, which is achieved with the formulations obtained from the composition of the present invention, whose effectiveness with the reduction of weed infestation is directly related to the system constituted by the need for less time of action in the weeds X less loss of the applied product X less time of exposure to the elements.

Likewise, the composition of the present invention has been shown to be effective in controlling one or more plant species of one or more of the following genera: *Aeschynomene rudis; Alternanthera tenella; Amaranthus hybridus; Amaranthus viridis; Bidens pilosa; Brachiaria decumbens; Brachiaria plantaginea; Brachiaria brizantha; Cenchrus echinatus; Conyza bonariensis; Cynodon dactylon; Cyperus ferax; Cyperus rotundus; Commelina benghalensis; Digitaria horizontalis; Digitaria sanguinalis; Eleusine indica; Emilia sonchifolia; Euphorbia heterophylla; Echinochloa crusgalli; Galinsoga parviflora; Lolium multiflorum; Nicandra physaloides; Panicum maximum; Raphanus raphanistrum; Richardia brasiliensis; Sida rhombifolia; Solanum americanum; Tridax procumbens; Amaranthus hybridus; Ipomoea nil; Portulaca olerace; Chamaesyce hirta*.

Thus, the search for an effective balancing of a surfactant system compatible with potassium and isopropylammonium salts of glyphosate in high concentrations, in order to obtain better efficacy results in the control of different weed species, has been a challenge, which had not yet been proven by the state of the art.

INVENTION SUMMARY

The present invention relates to a herbicidal composition comprising the combination of glyphosate salts (isopropylammonium salt and potassium salt) in perfect interaction with a surfactant system composed of an oxidized amine, an aliphatic alcohol and a complexing agent, as well as other adjuvants, potentiators (spreading, wetting, adhering, penetrating, protecting and wetting agents), as well as utility adjuvants (acidifying, antifoaming, compatibilizing, emulsifying, chelating, dispersing and buffering agents) which in the face of such perfect balancing produce surprisingly better agronomic efficacy than those already known in the prior art.

Thus, the subject of the present invention is an herbicidal composition with perfect balance between the different sources of glyphosate salts employed in the composition of the invention (MIPA salt, and potassium salt) and the innovative surfactant system, in addition to the ranges of proportions and concentrations of each component in the formulation.

The objective of this study was to obtain better efficacy results in the control of different weed species, as well as the control of regrowth of sugarcane when compared to formulations of the prior art.

As a consequence, the preferred combinations of the present invention have made it possible to achieve compositions with lower environmental impact and excellent cost/benefit ratio, since the assertiveness in the agricultural operations with better results could reduce the number of herbicide applications.

The herbicidal composition of the invention comprises specific ranges of each ingredient of the formulation so as to achieve a much greater efficacy thereby reducing the required amount of acid glyphosate to be applied in the field by the farmer thereby reducing the number of applications and the possibility of occurrence of operational errors.

Surprisingly, according to the object disclosed in the present invention, the achievement of the highest speed and consistency of weed control results in the different crops (especially soybean), as well as in the control of regrowth of sugarcane for the eradication of this crop in sugarcane reforestation areas, thus allowing new plantations with greater safety and speed.

Such results, when compared to the traditional formulations of glyphosate present on the market, have unexpectedly and favorably stood out in all the research and development results carried out by the investigators of the present invention, as demonstrated in the tests and examples presented herein and which demonstrate the effectiveness of the present invention.

In order to increase the concentration of the glyphosate herbicide, different compositions containing the association of glyphosate salts, particularly the MIPA salt and the potassium salt, were investigated, determining the proportion between them, and aiming to potentiate the agronomic effectiveness of said composition.

More particularly, to develop said compositions, different ratios of these salts were evaluated until a more adequate and effectively effective proportion was found to preserve the benefits of the MIPA salt and the potassium salt, maximizing its penetration, absorption and translocation of the glyphosate.

This ideal proportion of glyphosate salts consists of a necessary amount of the potassium glyphosate salt for rapid penetration into the plant, and a necessary amount of MIPA salt to maintain the liquid drop for longer on the leaf surface, thereby increasing the possibility of herbicide penetration.

In order to reach the optimum proportions of the different glyphosate salts, several aspects were evaluated, from the agronomic efficacy, considering the absorption rate, the greater washing tolerance of the herbicides in the leaf susceptible to rainwater after the application, control in different weeds and post-emergence selectivity to soybean cultivation, as well as the highest possible concentrations of the different glyphosate salts, resulting in greater logistics, herbicide efficacy, less impact on the environment and safety.

The composition of the invention comprises a mixture of potassium glyphosate and MIPA glyphosate (monoisopropylamine). Preferably the ratio of glyphosate (acid equivalent) in the potassium salt and MIPA salt forms is in the range of 15 to 40%, more preferably 20 to 35% relative to the total weight of the formulation.

It should be noted that the ideal ratio between the isopropylammonium salts and the glyphosate potassium salt is highly influenced by the surfactant system and other adjuvants present in the formulation.

Thus, the objective was to simultaneously select the ranges of ideal proportions between said salts and the best arrangement of a surfactant system and adjuvants to optimize the efficacy of glyphosate and, consequently, to minimize the impacts and risks associated with its use.

Said surfactant system, as well as the other adjuvants, have been investigated in order to develop a set of adjuvants that reduce the surface tension of the product, that is, alter the interfacial and superficial properties of a liquid. This group has this characteristic due to its structure, which is composed of a polar (hydrophilic) part and an apolar (hydrophobic) part. This system itself constitutes a single adjuvant, having properties such as, amphoteric aspect (low pH acts as cationic surfactant), detergency, excellent wetting, water soluble, water stable in a pH range of 4 to 9, non-toxic and biodegradable.

Preferably said surfactant system consists of a mixture of an oxide amine and an alcohol, such as preferably 1,2-ethanediol or ethylene glycol, which has the function of acting as a hydrotope for the stabilization of the surfactant system.

This set of developed surfactants has as its main role in the composition of the invention to play an important role as a facilitator for the glyphosate penetration in the leaf.

Thus, through the present invention it was possible to develop a formulation in which an ideal relationship between the glyphosate salts, combined with the ideal amount of a group of specifically selected adjuvants, was established which afforded a final product with a higher concentration of the active ingredient, better herbicide efficacy and plant dynamics.

The relationship between the ideal proportions of the glyphosate salts (potassium salt and MIPA) and the proportions of the surfactant system and the adjuvants of the present invention has been established so as to suitably suit a set of three processes responsible for penetration and the different glyphosate salts in plants, namely: penetration, absorption and translocation.

Briefly, these proceedings consist of:

Penetration: is the initial movement by the apoplast (set of components without metabolic activity). In this step, the adjuvants are fundamental, because the glyphosate is a polar compound and must interact and cross several layers of apolar compounds of the cuticle. The use of inadequate adjuvants may limit the movement of glyphosate in apoplast, especially in compounds of lower polarity in the cuticle;

Absorption: is the passage from the apoplast to the symplast. It occurs after the penetration. It cannot take place if there is no penetration; and Phloem Translocation: essential for the herbicide to reach all parts of plants, including the root system.

On the other hand, in order to increase the concentration of the active ingredient (i.a), it was sought to identify the largest possible concentration of effectiveness of the herbicide, maintaining it physically and chemically stable. Thus, this "ideal ratio" of glyphosate salts that met the above assumptions was identified as being achieved by the association of the potassium glyphosate salt and the MIPA glyphosate salt, by the reactions recited below:

$$C_3H_8NO_5O + C_3H_9N \rightleftharpoons C_6H_{17}N_2O_5P \quad (1)$$

$$C_3H_8NO_5O + KOH \rightleftharpoons C_3H_7KNO_5P + H_2O \quad (2)$$

As the reaction occurs (2) displacing the equilibrium to the acid form, the release of the K+ ion will occur. Thus, the ideal proportion of potassium salts and glyphosate MIPA in the herbicidal composition according to the present invention is described in table 1 below:

TABLE 1

| Ideal ratio and range of the different glyphosate salts. | |
|---|---|
| Proportion of salts in the composition of potassium (K) and isopropylammonium (MIPA) of glyphosate | Percentage Ranges in the Present Invention |
| Potassium (K) | 50%-60% |
| Isopropylammonium (MIPA) | 40%-50% |

TABLE 1-continued

Ideal ratio and range of the different glyphosate salts.

| Proportion of salts | Ranges in the Formulations of the Present Invention |
|---|---|
| Potassium (K)/Isopropylammonium (MIPA) | 1.1-2.0 |

In addition, the surfactant system of the present invention is composed of amine oxide-based compounds and the monoethylene glycol base and a complexing agent, in addition to other adjuvants such as, for example, an antifoaming agent.

The ideal ratio of the glyphosate salt mixture to the surfactant system, which constitutes the perfect balance between the components of the invention, is in a molar ratio of about 94.56:5.44 to 83.73:16.27, preferably 93.09:6.91 to 86.75:13.25.

Such ratios result in a final product with the highest concentration of the active ingredient (glyphosate acid equivalent), not less than 500 g/L, wherein the cations comprise potassium and propyl ammonium cations in a molar ratio of about 56:44 to about 58:42, which translates into improved herbicide efficacy and plant dynamics, as can be seen in Table 2 below.

TABLE 2

Ideal ratio between the mixture of glyphosate salts and the surfactant system.

| Idea proportions of formulation components | Composition range | |
|---|---|---|
| Components | % m/m | Proportion |
| Glyphosate salts | 40-70 | 94.56-83.73 |
| Surfactant system | 2.3-13.6 | 5.44-16.27 |

The composition of the Surfactant System, regarding the correlation between the adjuvants, is described in Table 3 below:

TABLE 3

Composition between the adjuvants of the present invention - Composition of the Surfactant System.

| Components - Surfactant System - Ideal proportions | Proportion of composition surfactant system |
|---|---|
| Amine oxide surfactant | 2 to 5% |
| Monoethylene glycol surfactant | 0.1 to 2.00 |
| Complexing agent | 0.01/% to 1.00% |

Accordingly, in the case of the concentrated aqueous formulations of high-load glyphosate salts of the present invention containing a perfect balance and interaction of the different types of salts of glyphosate with the surfactant system in addition to other adjuvants in their respective proportions defined by the invention, present superior herbicidal results when compared to traditional formulations of glyphosate such as Original Roundup® and Roundup WG®, both produced and marketed by Monsanto Co., as will be seen later.

BRIEF DESCRIPTION OF THE FIGURES

The present invention will be adequately demonstrated from the following figures, representative of the results of the tests performed, proving the effectiveness of the composition of the present invention, wherein.

DETAILED DESCRIPTION OF THE INVENTION

Figure 1:
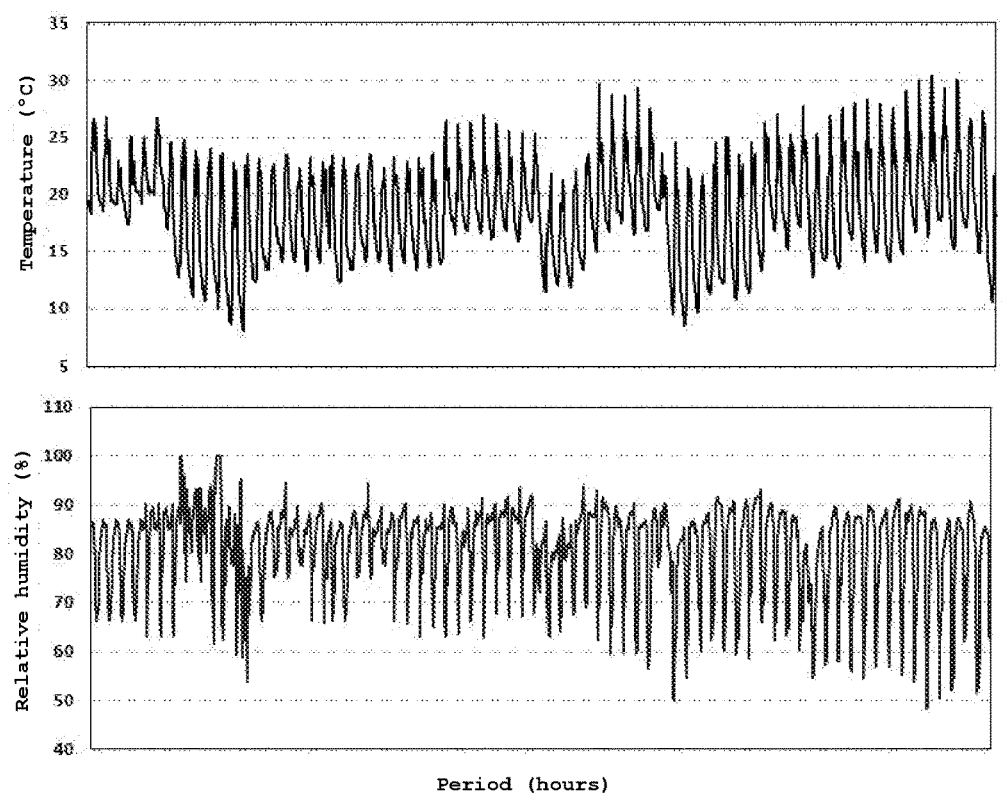
FIG. 1 corresponds to the data of temperature (° C.) and relative humidity of the air (%) of the greenhouse during the period of conduction of the experiments.

The herbicidal composition of the present invention comprises a surfactant system in a perfect balance of its concentrations relative to the potassium and glyphosate MIPA salts.

Particularly, the herbicidal composition of the present invention comprises: a) a surfactant system formed of monoethylene glycol-based amine-based compounds and a complexing agent, in addition to other adjuvants such as: b) antifoaming agent, c) solvent and in perfect balance with the potassium and MIPA salts in proportions between 0.2 and 1.0 relative to the pure acid glyphosate content (100%) in the formulation.

Particularly, the surfactant system employed in the composition of the present invention is characterized in that it comprises one or more compounds of formula (I):

belong to the amine oxide class, preferably alkyl dimethylamine oxide (amphoteric surfactant), preferably such as N, N-dimethyldodecylamine oxide, represented by the general formula (I).

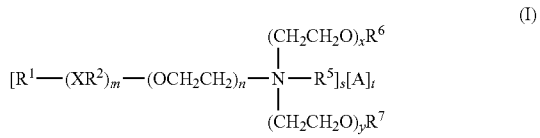

A subgroup of the surfactants of formula (I) are those wherein R 1 is a C 8-C 18 aliphatic chain and m is zero. More specifically, when R1 can be considered the hydrophobic moiety of the surfactant and is directly attached to the amino function, there are the alkylamines.

More specifically still, when in formula (I) R1 is an aliphatic chain $C_8$-$C_{18}$, m is zero, $R^5$ is an anionic oxide group, t is zero is the surfactants commonly known or referred to as alkyldimethylamine oxides (where n, x and y are zero and $R^6$ and $R^7$ are methyl.

According to the present invention a group of preferred surfactants comprising the surfactant system are the alkyldimethylamine oxides (amphoteric surfactant), such as the N, N-dimethyldodecylamine oxide represented by the formula (II).

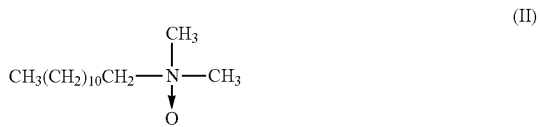

The amphoteric surfactants have excellent compatibility with other surfactants, forming mixed micelles, being chemically stable in both acids and alkalis.

Another class of surfactants of interest in particular to the concentrated aqueous composition of the present invention are aliphatic diols, such as the monoethylene glycol, preferably 1,2-ethanediol, compounds of formula (III).

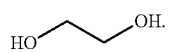
(III)

Among the complexing agents of interest to the present composition are those based on diethylenetriaminepentaacetate (DTPA) represented by the formula (IV).

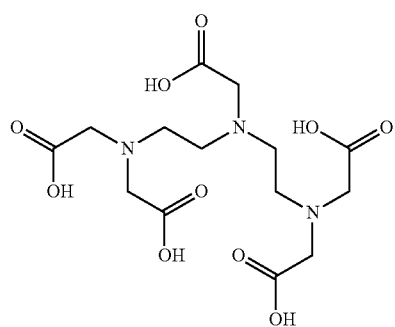
(IV)

This complexing agent assists in the physical stability of the formulation and the physical stability in the syrup to be used.

Among the antifoaming agents pertinent to the herbicidal composition of the present invention are the silicon compounds, preferably silicones and/or siloxanes, such as, for example, Silcolapse® C585, produced by Elkem Co. The antifoaming agent can be a polydimethylsiloxane.

Turning now to a more detailed description, the present invention specifies the creation of a surfactant system formed by an alkyldimethylamine oxidase, monoethyleneglycol and a complexing agent in association with an antifoaming agent and forming stable and balanced solutions in combination with the potassium and isopropylammonium glyphosate, high charge.

Exemplary formulations were made at concentrations of potassium glyphosate and MIPA salts in the proportion of 15 to 40% (w/w) and mixtures of the surfactant system, which acts as a unitary surfactant, composed of 2 to 5% N, N-dimethyldodecylamine oxide, 0.1 to 2% of monoethyleneglycol and 0.01 to 1% of diethylenetriaminepentaacetate, in addition to 0.01 to 1% of siloxanes.

The formulation of the present invention made it possible to observe the following unexpected properties: a) a chemically balanced and stable formulation, in due proportions, even with variations, of glyphosate salts; b) greater translocation of the glyphosate herbicide through the plant cuticle; and, c) greater efficiency when compared to commercial products: Glyphosate WG® and Original Roundup®. In terms of deposition in the plants to be treated, the formulations relative to the composition of the present invention showed a range of penetration and absorption in the weed leaves, at a ratio of 21.82 to 48.24% more efficient than those penetrations and absorptions achieved with Original Roundup and Roundup WG, considering the mean internal contents of shikimic acid in the plants of *brachiaria* grass (*Brachiaria decumbens*).

The final result achieved is therefore a greater consistency in the control of weeds due to the higher rate of deposition, absorption and penetration in the leaves of these undesirable plants, less exposure to rainwater losses after the application, higher product concentration in the biological target, greater control efficiency, lower rates of control failures and regrowths and, consequently, lower risks and reduced need to carry out new applications.

It may be stated, in other words, that the success of the formulations obtained from the composition of the present invention is directly related to the lower time of action of the formulation when applied to weeds, thus bringing about the advantages achieved with less loss of product due to the less time of exposure to the weather, and the decrease of the resurgence of weeds, against which the plantation is being treated.

Therefore, the assertiveness of weed control is superior due to the success of the application, thus reducing the cost of this control per treated hectare from 35% to 40% when compared to other areas where there is a greater risk or need of new applications and/or on the same product or on the use of other formulations to combat the same pest.

In summary, it should be understood that the present invention discloses a herbicidal composition ready to be solubilized in a tank to provide an aqueous solution suitable for field spraying which comprises different types of salts of glyphosate and a surfactant system and other adjuvants, having a much greater efficacy than other glyphosate formulations present in the market.

In a further aspect, the invention provides a method of preparing a glyphosate-based herbicidal composition comprising the steps of: adding to the reactor/homogenizer tank: 90% of the solvent; followed by the addition of the potassium hydroxide solution and the slow addition of the active ingredient, controlling the temperature at the maximum at 40° C. Then slowly add Isopropylamine, controlling the temperature at maximum at 40° C. and stir until complete reaction (pH 4.8 to 5.5). Then add antifoaming agent; the surfactant system and remaining solvent and stir until complete homogenization. Collect sample for physical and chemical control and after physical-chemical analysis pack the product.

EXAMPLES

An experiment was conducted in order to verify the effectiveness of the composition of the present invention in eradicating weeds by the use of high load glyphosate formulations according to the present invention.

The experiment was implemented and conducted over a period of three months. The objective was to study the deposition, penetration, absorption and efficacy of glyphosate formulations derived from the composition object of the present invention, in *brachiaria* grass (*Brachiaria decumbens* cv. Basilisk).

The experiment was designed in randomized blocks with a total of 10 repetitions to achieve high experimental accuracy.

The ten repetitions were divided into two blocks, one water stress test and the second block stress-free test as described.

The test in stress/stress-free conditions is fundamental to reproduce the conditions that occur in the field. Post-emergence herbicides must present consistent performance under different environmental conditions.

The results were submitted to analysis of variances. To compare the means of the treatments, the "t" test was used at the 5% probability level (p<0.05).

Experimental Units and Growing Conditions

The experimental units consisted of plastic containers with a capacity of 1.7 L, filled with 0.5 kg of commercial substrate, which were seeded with about 3 g of seeds and daily irrigated. After the emergence, thinning was carried out, and 20 brachiaria grass plants were kept in each pot.

After thinning, the experimental units with the brachiaria grass plants were divided into two blocks. One of them was kept in trays with water, being the irrigation by capillarity until the end of the tests, while in the other the irrigation was suspended, only occasional irrigations were carried out with small amounts of water to maintain the plants until the conduction of the experiments. In this second block the plants were kept under severe water stress until the end of the experiment. The blocks were identified as being stress-free water test, and with continuous water stress, respectively.

Figure 2:
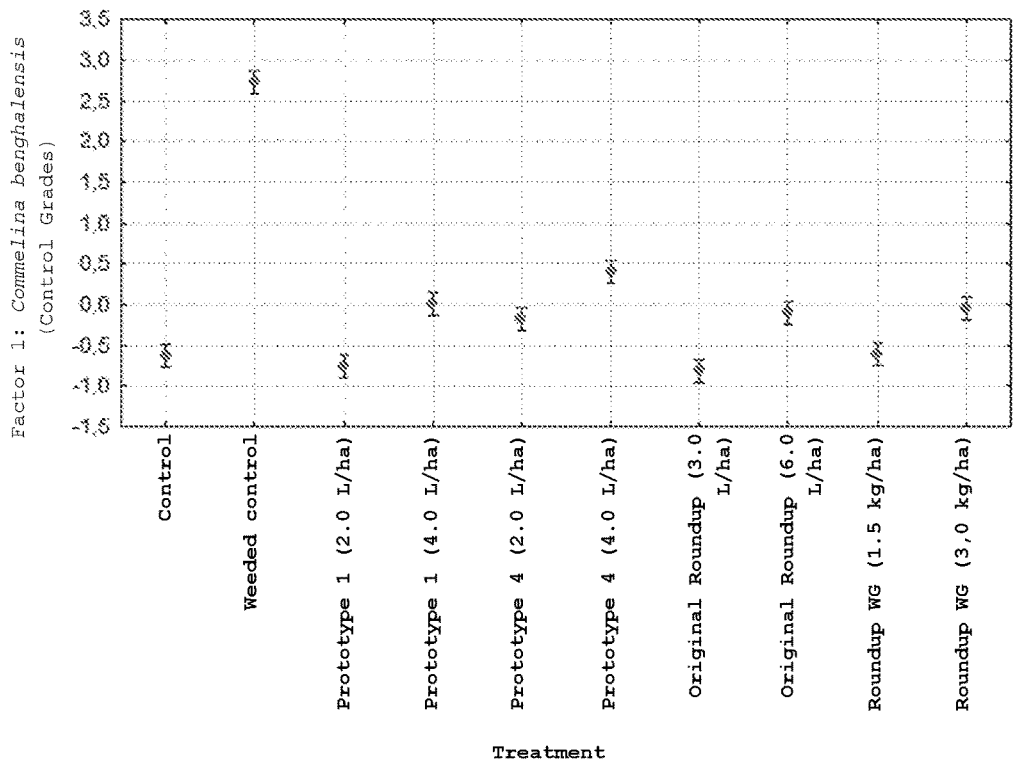
FIG. 2 corresponds to the scores of factor 1 (*Commelina benghalensis*/control scores) in the treatments related to the type of crop evaluated.

The experiments were conducted in a greenhouse with mean temperature of 20° C. and relative humidity of 70-80% and under natural light. The dates of seeding, emergence, thinning, application of treatments and evaluations are presented in Table 1, and the temperatures and relative humidity of the period are shown in FIG. 2.

Herbicidal compositions called Formulations 1 to 4 were prepared to carry out the respective T1 to T4 treatments by mixing the components in the weight preparations shown in Table 4 (% in weight).

TABLE 4

Examples of glyphosate-containing herbicidal formulations and the surfactant system of the invention.

| Formulation Components/Treatment | T1 % m/m | T2 % m/m | T3 % m/m | T4 % m/m | T5 % m/m | T6 % m/m | Function |
|---|---|---|---|---|---|---|---|
| Glyphosate Potassium Salt * | 20-25 | 20-25 | 20-25 | 25-35 | 25-35 | 25-35 | Active ingredient |
| Glyphosate Salt and Isopropylamine* | 25-35 | 25-35 | 25-35 | 20-25 | 20-25 | 20-25 | Active ingredient |
| N-oxides of amines (N, N-Dimethyldodecylamine oxide) | 3.0-5 | 2.0-3.0 | 2.5-4.5 | 3.0-5.0 | 2.0-3.0 | 2.5-4.5 | Surfactant |
| 1,2-Ethane Diol | 0.5-2.0 | 0.1-0.8 | 0.1-0.8 | 0.5-2.0 | 0.1-0.8 | 0.1-0.8 | Surfactant |
| Diethylene Triamine Pentacetic, sodium salt | 0.01-1.0 | — | — | 0.01-1.0 | — | — | Complexing Agent |
| (Carboxymethyl) dimethyl-3-((1-oxododecyl) amino) propylammonium hydroxide | — | 1.0-2.6 | — | — | 1.0-2.6 | — | Surfactant |
| Ethanolamine | — | — | 1.0-2.6 | — | — | 1.0-2.6 | Antifoam |
| Dimethyl Siloxane | 0.2-0.40 | 0.2-0.40 | 0.2-0.40 | 0.2-0.40 | 0.2-0.40 | 0.2-0.40 | Solvent/ |
| Water | 31.6-51.6 | 32.3-51.8 | 30.8-50.4 | 31.6-51.6 | 32.3-51.8 | 30.8-50.4 | Diluent |

The treatments employed in the experiments correspond more specifically to the following formulations:

Formulation 1 (T1)—consisting of a concentrated aqueous composition comprising glyphosate potassium salts and MIPA in the ratio of 0.2 to 1.0 and the system of surfactants (dodecyldimethylamino oxide+1,2-ethanediol) associated with complexing agent (diethylene triamino pentacetic sodium);

Formulation 2 (T2)—consisting of a concentrated aqueous composition comprising glyphosate potassium salts and MIPA in the ratio of 0.2 to 1.0 and the system of surfactants (dodecyldimethylamino oxide and 1,2-ethanediol and carboxymethyl); without adding the complexing agent;

Formulation 3 (T3) consisting of a concentrated aqueous composition comprising glyphosate potassium salts and MIPA in the ratio of 0.2 to 1.0 and the surfactant system consisting of dodecyldimethylamino oxide and 1,2-ethanediol+Ethanolamine), with a water-facilitating agent absorption of glyphosate;

Formulation 4 (T4)—consisting of a concentrated aqueous composition comprising glyphosate potassium salts and MIPA in the ratio of 1.1 to 2.0 and the dodecyldimethylamino oxide and 1,2-ethanediol surfactant system associated with complexing agent (pentasodium diethylene triamine pentaacetate);

Formulation 5 (T5)—consisting of a concentrated aqueous composition comprising glyphosate potassium salts and MIPA in the ratio of 1.1 to 2.0 and the dodecyldimethylamino oxide and 1,2-ethanediol+Carboxymethyl surfactant system);

Formulation 6 (T6)—consisting of a concentrated aqueous composition comprising glyphosate potassium salts and MIPA in the ratio of 1.1 to 2.0 and mixtures of surfactants associated with glyphosate absorption facilitating agent;

Original Roundup (T7)—consisting of the commercial reference product in the Original Roundup market;

Roundup WG (T8)—consisting of the commercial reference product on the Roundup WG market; and Control without application of glyphosate herbicide (T14)—consisting of glyphosate-free controls.

TABLE 5

Ratio and period of accomplishment of the main activities of the conduction of the experiments.

| Activity | Data |
| --- | --- |
| Seeding | Day 1 |
| Emergency | Day 7 |
| Thinning | Day 7 |
| Application of treatments | Day 12 |
| Absorption rating: 24 hours | Day 13 |
| Evaluation of phytotoxification at 7DAA | Day 7 |
| Evaluation of phytotoxification at 14DA | Day 14 |
| Evaluation of phytointoxication at 21DA | Day 21 |
| Evaluation of phytotoxification at 28DA | Day 28 |
| Evaluation of final biomass | Day 28 |

*DAA—Days after the application.

The treatments were composed of 6 formulations, 2 commercial standards of the state of the art and 1 control, totaling the 9 treatments presented in Table 6, evaluated in two conditions (stress/stress-free water test). The dose used was 270 g e.a. ha$^{-1}$.

TABLE 6

List of the treatments used in the experiments.

| No. Treatment | Treatments | Dose (g e.a. ha$^{-1}$) |
| --- | --- | --- |
| T1 | Formulation 1 | 270 |
| T2 | Formulation 2 | 270 |
| T3 | Formulation 3 | 270 |
| T4 | Formulation 4 | 270 |
| T5 | Formulation 5 | 270 |
| T6 | Formulation 6 | 270 |
| T7 | Product Number: Original Roundup | 270 |
| T8 | Product Reference: Roundup WG | 270 |
| T14 | Control | 0 - No glyphosate |

Table 7 shows the local conditions at the time of application of the treatments.

TABLE 7

Local conditions at the time of treatment application.

| Date | Initial temperature (° C.) | Initial humidity (%) | Temperatura Final (° C.) | Final moisture (%) |
| --- | --- | --- | --- | --- |
| Day 1 | 25 | 52 | 27 | 50 |

All formulations of the composition of the present invention were applied to 3- to 4-leafed *brachiaria* grass plants (beginning of tillering). For the application, a stationary nozzle installed in a closed environment equipped with four spray tips XR110.02VS, spaced 0.5 m apart and positioned at 0.5 m height relative to the surface of the targets.

The system was operated with a displacement speed of 3.6 km h−1, with application volume of 200 L ha−1 and constant pressure of 1.5 bar pressurized by compressed air. The environmental conditions during the application were monitored and presented in Table 7. After the application of the formulations the experimental plots were transported back to the greenhouse, remaining until the end of the test.

The evaluations were carried out by analysis of deposition, absorption and glyphosate activity. The activity was evaluated by means of the shikimic acid contents, intermediate compound of the metabolic route inhibited by glyphosate and that accumulates in the plants after the application of this herbicide. Visual assessments of intoxication and final dry biomass were also conducted.

It should be noted that the glyphosate contents internally in the foliar tissues of *Brachiaria decumbens* were considered the priority information. As discussed above, this information is most useful for classifying the formulations in terms of the deposition capacity, penetration and absorption by the indicator plants.

From the results obtained, the dose expressed in grams of acid/ha equivalent was determined for each evaluated experimental or commercial product to reach the concentration of 1 ng glyphosate/g of leaf biomass of *Brachiaria decumbens*. The unit ng/g (nanogram/gram) is equivalent a µg/kg ou mg/t.

Efficacy evaluations based on visual scales or by determination of the accumulations of biomass do not always allow to differentiate various formulations. If the experimental dose is high, all treatments promote high levels of control. If it is low, possibly none will be effective. Therefore, discrimination is only possible when the selected dose is in the range of high responsiveness of the test plant to the herbicide. The objective, in this case, is to define what range of responsiveness this is.

Absorption analysis of glyphosate was performed 24 hours after the application. For this, 8 plants of *brachiaria* grass were collected per experimental unit, which were weighed and submitted to two consecutive washes with 100 mL of deionized water. The solution resulting from these washes, 200 mL, was homogenized and a 15 mL aliquot was stored, for further quantification of the contents of the compounds that presented external to the vegetal tissues (external content).

Then, the washed plant material was stored in a freezer at −80° C. for further determination of internal glyphosate contents, its metabolites and herbicide indicators.

In order to determine the contents of the compounds, the samples were submitted to the following protocol:
a) Determination of the external content: about 3 mL of the wash solution was subjected to filtration in PVDF (Millex® HV) membrane filters with 0.45 µm pores and conditioned in chromatographic vials with a capacity of 1.5 mL volume; and
b) Determination of internal contents: the washed and stored vegetal material was ground by manual maceration in liquid nitrogen and subjected to lyophilization for 72 hours. After extracting the compounds (glyphosate and shikimic acid), 10 mL of acidified water (pH 2.5) was added in about 0.2 and 0.1 g of the ground and dried vegetal material, respectively, *brachiaria* and fireplant grass (*Euphorbia heterophylla*).

The samples were then sonicated for 30 minutes at 50-55øC, and centrifuged for 5 minutes at 10,000 rpm for decantation of the plant fragments. The supernatant was filtered through a PVDF membrane filter (Millex® HV) with 0.45 µm pores and packed in vials for analysis. The contents present in the leaves after washing were internalized. The results are shown in Table 8. All contents were transformed into ng g−1 of dry biomass. The external and internal contents of the compounds were identified and quantified by specific high performance chromatography procedures combined with quadrupole type mass spectrometry (HPLC LC/MS/MS ABSciex Triple Quad 4500). The deposition in the plants corresponds to the total content that was obtained by adding the external and internal contents.

It should be noted that the internal content is the most relevant feature to compare the different treatments, since they reflect all possible changes in the deposition, penetration and absorption of the herbicide glyphosate.

Phytotoxicity or visual phytotoxification were performed at 7, 14, 21 and 28 days after the application (DAA), using as reference the control without glyphosate application and using a procedure standardized by the Brazilian Society of Weed Plant Science (SBCPD).

For example, a score of "0" was attributed to the absence of symptoms and "100" to the death of the plants. Table 4 shows the results of phytotoxicity.

The final dry shoot biomass was determined at 28 days after the application of the herbicides. All the tillers were cut, collected and dried at 55° C. until constant weight in a forced air circulation oven. The determination of the biomass was done in a scale with precision of (0.001 g). Table 9 presents the biomass determination results, while table 10 shows the mean levels of the presence of shikimic acid present in the treated plants.

Tables 11, 12 and 13, therefore, present the means of the treatments and the results of the analysis of variances for the three characteristics—compound content—phytotoxicity and determination of the biomass, indicators of the effectiveness of the treatments in the control of the *Brachiaria decumbens*.

The visual evaluation and the determination of the dry biomass accumulation were made at 28 days after the application of the herbicides. Shikimic acid content was evaluated 24 hours after the application.

TABLE 8

Mean of the visual percentages of control of *Brachiaria decumbens* 28 days after the application of the treatments.

| Products | Glyphosate Dose g de e.a./ha | Control (%) |
| --- | --- | --- |
| Formulation 1 | 270 | 77.00 cd |
| Formulation 2 | 270 | 81.00 bc |
| Formulation 4 | 270 | 85.50 abc |
| Formulation 5 | 270 | 87.50 ab |
| Original Roundup | 270 | 91.50 a |
| Roundup WG | 270 | 71.50 d |
| Control | 0 | 0.00 e |
| Variance analysis results | | |
| F for Block | | 25.46 ** |
| F for Treatments | | 57.57 ** |
| Coefficient of variation- % | | 18.80 |
| d.m.s. - Test t ($p < 0.05$) | | 9.91 |

* Means followed by the same letter (a, b, c, d and e) do not differ statistically from one another at the 5% probability level ($p < 0.05$).
** Significant at the 1% probability level ($p < 0.01$)
Obs.: F for blocks and treatments are statistical parameters,

TABLE 9

Mean values of dry masses of *Brachiaria decumbens* 28 days after the application of treatments. Unit: g/plot.

| Products | Glyphosate Dose g de e.a./ha | Dry Mass (g) |
| --- | --- | --- |
| Formulation 1 | 270 | 3.54 b |
| Formulation 2 | 270 | 3.61 b |
| Formulation 4 | 270 | 3.16 b |
| Formulation 5 | 270 | 3.67 b |
| Original Roundup | 270 | 3.47 b |

TABLE 9-continued

Mean values of dry masses of *Brachiaria decumbens* 28 days after the application of treatments. Unit: g/plot.

| | | |
| --- | --- | --- |
| Roundup WG | 270 | 4.00 b |
| Control | 0 | 17.47 a |
| Variance analysis results | | |
| F for Block | | 34.34 ** |
| F for Treatments | | 27.94 ** |
| Coefficient of variation- % | | 56.58 |
| d.m.s. - Test t ($p < 0.05$) | | 2.35 |

* Means followed by the same letter do not differ at the 5% probability level ($p < 0.05$).
** Significant at the 1% probability level ($p < 0.01$)

TABLE 10

Mean values of shikimic acid in *Brachiaria decumbens* plants 24 hours after the application of treatments. Unit: ng/g.

| Products | Glyphosate Dose g de e.a./ha | Shikimic acid content ng/g |
| --- | --- | --- |
| Formulation 1 | 270 | 126,631.6 |
| Formulation 2 | 270 | 124,497.2 |
| Formulation 4 | 270 | 118,861.6 |
| Formulation 5 | 270 | 107,213.5 |
| Original Roundup | 270 | 97,188.8 |
| Roundup WG | 270 | 96,214.0 |
| Control | 0 | 51,091.5 |
| Variance analysis results | | |
| F for Block | | 0.65 ns |
| F for Treatments | | 2.12 ns |
| Coefficient of variation- % | | 54.83 |
| d.m.s. - Test t ($p < 0.05$) | | — |

*Means followed by the same letter do not differ at the 5% probability level ($p < 0.05$).
*ns: Not significant at the 5% probability level ($p < 0.05$)

In terms of visual evaluation of control, the highest means were observed for significant differences between Formulations 4 and 5 and the Original Roundup. The lowest mean was observed for the plants that did not receive the application of glyphosate, that is, of the control. On the other hand, although no significant statistical difference was observed in relation to the shikimic acid content between the Formulations of the invention and the reference standard products, it is noted that Formulations 1 to 5 presented the highest values of shikimic acid (Table 10), when compared to market reference products and much higher than control plants.

The most accurate and biologically adequate to evaluate and compare the efficacy of post-emergence herbicides is the accumulation of dry biomass of indicator plants (Table 9), that is, the lower the accumulation of dry biomass, greater control of the weed. Regarding the weed tested, the lowest mean was observed for Formulation 4, that is, that presented greater control for *Brachiaria decumbens*, in relation to commercially known products and statistically differing from the treatment of the control, at 5% probability.

Tables 11 and 12 show the means of treatments and results of the statistical analysis of total and internal glyphosate contents, according to the present invention, 24 hours after the application.

The highest mean for the total content was observed for Formulation 1. On the other hand, the lowest mean total contents were observed for Formulations 2 and 5. Intermediate values were observed for Formulation 4.

TABLE 11

Mean values of total glyphosate contents in *Brachiaria decumbens* plants 24 hours after the application of treatments. Unit: ng/g.

| Products | Glyphosate Dose g de e.a./ha | Glyphosate content ng/g |
|---|---|---|
| Formulation 1 | 270 | 9,168.7 a |
| Formulation 2 | 270 | 7,886.9 ab |
| Formulation 4 | 270 | 8,127.1 ab |
| Formulation 5 | 270 | 7,808.7 ab |
| Original Roundup | 270 | 8,168.9 ab |
| Roundup WG | 270 | 8,653.2 ab |
| Control | 0 | 0.0 c |

| Variance analysis results | |
|---|---|
| F for Block | 10.29** |
| F for Treatments | 32.17** |
| Coefficient of variation- % | 24.86 |
| d.m.s. - Test t (p < 0.05) | 1,321.6 |

* Means followed by the same letter do not differ at the 5% probability level (p < 0.05).
**Significant at the 1% probability level (p < 0.01)

TABLE 12

Mean internal contents of glyphosate in *Brachiaria decumbens* plants 24 hours after the application of treatments. Unit: ng/g.

| Products | Glyphosate Dose g de e.a./ha | Glyphosate content ng/g |
|---|---|---|
| Formulation 1 | 270 | 235.59 b |
| Formulation 2 | 270 | 232.79 b |
| Formulation 4 | 270 | 300.55 a |
| Formulation 5 | 270 | 242.37 b |
| Original Roundup | 270 | 246.71 b |
| Roundup WG | 270 | 202.61 b |
| Control | 0 | 0.0 c |

| Variance analysis results | |
|---|---|
| F for Block | 16.68** |
| F for Treatments | 18.84** |
| Coefficient of variation-% | 33.71 |
| d.m.s. - Test t (p < 0.05) | 52.54 |

* Means followed by the same letter do not differ at the 5% probability level (p < 0.05).
**Significant at the 1% probability level (p < 0.01)

As previously reported, the most relevant feature to compare treatments and to order them in terms of combined performance in the deposition, penetration and absorption processes is the internal glyphosate content evaluated 24 hours after the application (Table 12).

Analysis of the results indicates that Formulation 4 provided the highest concentrations of glyphosate internally to the leaves of *Brachiaria decumbens*. The mean internal glyphosate content observed for Formulation 4 was significantly higher than the mean of all other treatments with herbicide application, indicating that this was the product with the best combined performance in terms of deposition, penetration and absorption by the leaves of *Brachiaria decumbens*. It should be noted that the experiment on *Brachiaria decumbens* was conducted with a total of 10 repetitions (5 with and 5 without water stress).

Considering that there were 10 *Brachiaria decumbens* plants in each experimental unit, the mean levels were obtained considering a total of 150 plants per treatment.

The mean internal contents of glyphosate in the foliar tissues of *Brachiaria decumbens* are shown in Table 13. However, the mean levels were expressed as a percentage of the means observed for the Original Roundup, Roundup WG and for the two products together.

The results indicate that Formulation 4 of the invention allowed for internal leaf glyphosate concentrations to be 21.82%, 48.34% higher than the Original Roundup and Roundup WG trade standards, respectively. When the two standards were considered together, the advantage of Formulation 4 was 35.08%.

TABLE 13

Mean internal contents of glyphosate in *Brachiaria decumbens* plants 24 hours after application of treatments. Values expressed as a percentage of the original Roundup, Roundup WG mean and the mean for the two trade patterns.

| Products | Glyphosate Dose g de e.a./ha | Glyphosate content ng/g | % of the Original Roundup mean | % of the Original Roundup WG mean | % of the mean of the two commercial standards |
|---|---|---|---|---|---|
| Formulation 1 | 270 | 235.59 | 95.49 | 116.28 | 105.88 |
| Formulation 2 | 270 | 232.79 | 94.36 | 114.90 | 104.63 |
| Formulation 4 | 270 | 300.55 | 121.82 | 148.34 | 135.08 |
| Formulation 5 | 270 | 242.37 | 98.24 | 119.62 | 108.93 |
| Original Roundup | 270 | 246.71 | 100.00 | 121.77 | 110.88 |
| Roundup WG | 270 | 202.61 | 82.12 | 100.00 | 91.06 |
| Control | 0 | 0.0 | 0.00 | 0.00 | 0.00 |

Formulations 1 and 2 have similar combinations and proportions of glyphosate salts (potassium salt/MIPA 0.74). The same is true for Formulations 4 and 5 (potassium salt/MIPA 1.34).

In terms of the surfactants present in the formulation, they are similar in Formulations 1 and 4 and in Formulations 2 and 5, as can be seen in Table 4.

The analysis of the presented results, especially the information regarding the internal glyphosate contents in the leaves of Brachiaria decumbens (Tables 9 and 10) indicates that the development of a high performance glyphosate formulation in terms of leaf surface deposition, penetration and absorption and translocation of the glyphosate in the weed depends both on the combination and proportion of the salts present and the surfactants used, as proposed in the formulations indicated in said Table A, and named as Formulation 1 to 4.

Optimization of these two variables allowed for the development of the various Formulations shown in Table 4, and more particularly, it was observed that with respect to Formulation 4, a mean gain of 21.82% and 48.34% would have been achieved with the use of said formulation of the invention, in relation to the reference commercial products Original Roundup and Roundup WG, respectively, when compared to the treatments against Brachiaria decumbens carried out with this formulation and the commercial formulations mentioned.

Similarly, it can be seen from the results presented in Table 10 that all of the Formulations of the present invention, when subjected to the tests performed for the treatment of Brachiaria decumbens, showed more significant values than the commercial formulation Roundup WG.

Such gains are highly significant indicating that either Formulation 4 may have greater control consistency when the same dose is applied or may also require a lower dose for the same level of control to be achieved which has great agronomic and environmental advantages, like the other Formulations tested, also present value of herbicidal effectiveness. This is particularly evident when such formulations are applied against less aggressive cultures than Brachiaria decumbens, when compared to the commercial formulations targeted for comparison.

In summary, the analyses of the research results allowed us to confirm that the present invention is the result of the optimization of these two variables composition consisting of the combination of different types of glyphosate salts and the balancing of the surfactant system and/or adjuvants in adequate concentrations and proportions, in other words, the development of the composition of the present invention, and particularly with respect to the performance of Formulation 4 resulted in mean gains of 21.82% and 48.34% in performance relative to commercial standards employed comparatively, Original Roundup and Roundup WG, respectively, in terms of mean internal contents in the leaves of Brachiaria decumbens.

On the other hand, when considering the management of weeds difficult to control in pre-sowing or planting applications of the different crops in experiments conducted under field conditions, it is noted that the composition of the herbicide glyphosate of the present invention containing the perfect balancing of concentrations of different glyphosate salts and surfactants and/or adjuvants is fundamental in those applications in which weed management is considered in pre-planting or pre-planting of different crops.

Within this context, a few additional tests were conducted in the form of experiments with the herbicidal composition based on high load glyphosate, objective of the present invention, associated or not to other herbicides with different mechanisms of action, thus making possible the good practices of handling of resistant weeds in key agricultural crops.

By means of the composition of the present invention it was possible to study the management of difficult-to-control weeds, such as goosegrass (Eleusine indica) and Benghal dayflower (Commelina benghalensis), among others in the application.

That is, evaluations were made in the application of pre-sowing and/or planting of agricultural crops, such as soybean, maize, cotton and others, with different formulations of glyphosate herbicide containing different glyphosate salts and surfactants, as well as adjuvants in perfect balance and concentrations thereof in high-load glyphosate formulations.

The experiment was experimentally designed in randomized blocks with a total of 04 repetitions. Each experimental plot had a size of 05 by 03 meters, making a total of 15 $m^{-2}$ per plot.

The treatments were composed of 2 formulations (1 and 4) and 2 commercial standards in two doses plus two controls (Unweeded/weeded Control), totaling the 10 treatments presented in Table 14. The doses used were 1080 and 2160 g e.a. $ha^{-1}$.

TABLE 14

List of the treatments used in the experiments.

| Herbicidal Treatments | Dose in g e.a./ha | Commercial standard dose L/ha |
|---|---|---|
| Unweeded Control | — | — |
| Weeded Control | — | — |
| Formulation 1 | 1080 | 2.0 |
| Formulation 1 | 2160 | 4.0 |
| Formulation 4 | 1080 | 2.0 |
| Formulation 4 | 2160 | 4.0 |
| Original Roundup | 1080 | 3.0 |
| Original Roundup | 2160 | 6.0 |
| Roundup WG | 1080 | 1.5 |
| Roundup WG | 2160 | 3.0 |

The application was performed in an ideal condition, that is, with excellent humidity and with weeds in high vegetative vigor. The control of the Benghal dayflower (Commelina benghalensis) was evaluated at 7, 14 and 21 days after application of the treatments (DAT), in a visual form using the percentage scale of 0 to 100%, where 0% corresponds to no control and 100% to total control (excellent). The results were submitted to multivariate analysis as detailed below.

In the multivariate analyses, the interactions between the measured variables were identified through factorial analysis. It should be emphasized that only the most representative variables are selected by the analysis, capable of identifying the processes that best explain the behavior of interest. In the case of the present study, no variables were removed from the analysis.

Figure 3:
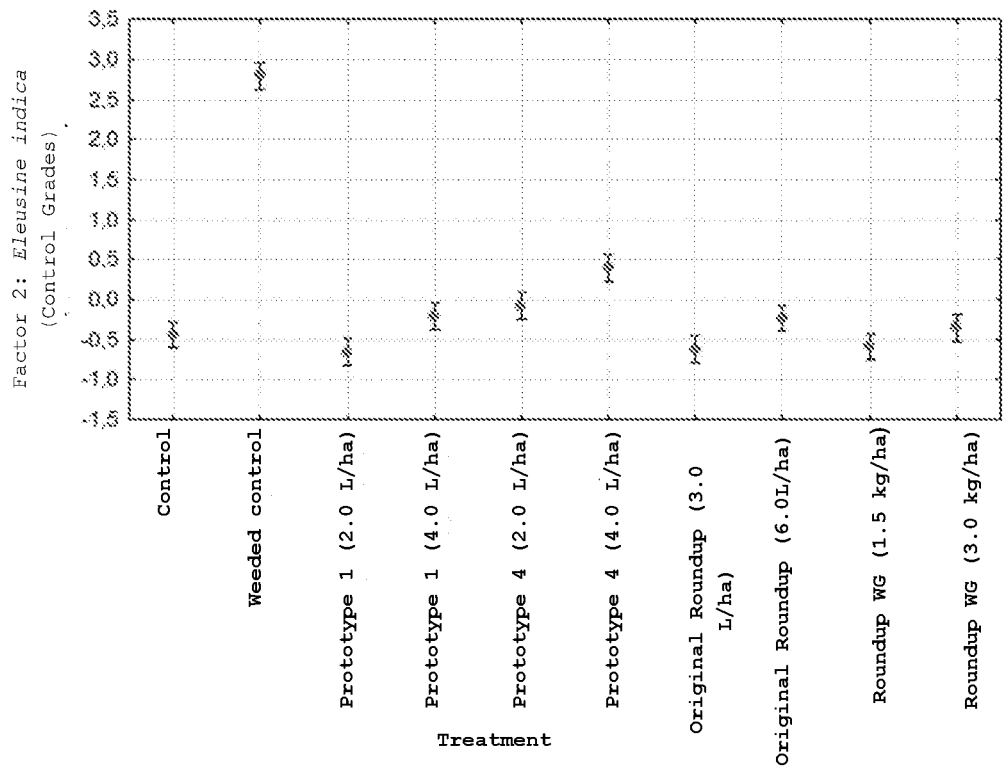
FIG. 3 corresponds to the scores of factor 2 (*Eleusine indica*/control scores) in the treatments related to the type of crop evaluated.

The univariate analysis of variance (ANOVA) was performed with the scores of the factors extracted to confirm if there is a significant difference between the treatments when the processes from the factor analysis were defined. Thus, the confidence intervals of 0.95 were used for the test. For interpretation purposes, if the vertical bars (FIGS. 2 and 3) denoting the confidence interval overlap, there is no significant difference ($p > 0.05$) between treatments.

When analyzing the results obtained in the present experiment, as well as discussing them, it can be observed that when the different formulations (formulations, balance and concentrations of salts of glyphosate and surfactants and/or adjuvants) when applied in the handling operation, that is, before the pre-sowing or planting operations of crops such as soybean, maize, cotton and others showed significant differences in the management of weeds of difficult control, resulting in good levels of control for these weeds.

When analyzing the results obtained in the management of goosegrass (*Eleusine indica*) e de Benghal dayflower (*Commelina benghalensis*), it is noted that the treatments with Formulation 1 (2.0 to 4.0 L pf/ha) and Formulation 4 (2.0 to 4.0 L pf/ha), compared to the commercial products used as comparison elements Original Roundup (6.0 L pf/ha), Roundup WG (1.5 kg pf/ha), Roundup WG (3.0 kg pf/ha), Original Roundup (3.0 L pf/ha), Original Roundup such formulations showed significant differences in weed management, favorably regarding the speed of control and final results.

Weed control scores (*Eleusine indica* and *Commelina benghalensis*) showed different behavior when evaluated at 07, 14 and 21 DAA. The variance of the original data was redistributed in two factors. The first factor (Factor 1) explained 51.5% of the variation and the second factor (Factor 2) 47.2% (Table 15).

In Factor 1, the control scores recorded for *Commelina benghalensis* at 07, 14 and 21 DAA were retained. In the Factor 2, the control scores for the goosegrass grass (*Eleusine indica*) were also evaluated at 07, 14 and 21 DAA.

Considering that the factors are orthogonal (uncorrelated), the processes retained in Factors 1 and 2 act independently of one another. In this way, ANOVA was performed with Factor 1 (FIG. 1) and Factor 2 (FIG. 2).

TABLE 15

Result of the factor analysis containing the first two factors (processes) with their respective factorial loads that represent the coefficients of correlation between the variables and each Factor.

| Variáveis | Rotation Varimax | |
|---|---|---|
| | Factor 1 51.5%* | Factor 2 47.2%* |
| CB (07 DAA) | 0.89 | 0.43 |
| CB (14 DAA) | 0.97 | 0.22 |
| CB (21 DAA) | 0.98 | 0.15 |
| EI (07 DAA) | 0.36 | 0.82 |
| EI (14 DAA) | 0.21 | 0.97 |
| EI (21 DAA) | 0.16 | 0.98 |
| Interpretation | *Commelina benghalensis*/ Control Notes | *Eleusine indica*/ Control Notes |

*Value referring to the percentage of variation of the original set of data retained by the respective factors. Load values in bold (>0.70 in absolute value) were considered in the interpretation of the factor.
CB = *Commelina benghalensis*;
EI = *Eleusine indica* e
DAA = days after application.

When ANOVA was performed with Factor 1 scores, a significant difference (F=224.82; p=0.0001) was observed between treatments when the control scores of *Commelina benghalensis* were evaluated at 07, 14 and 21 DAA, for example, by observing that the weeded Control differed from all treatments.

Formulation 1 (2.0 L/ha) and Original Roundup herbicides (3.0 L/ha) and Roundup WG (1.5 kg/ha) did not differ from Unweeded Control. On the other hand, Formulation 4 (4.0 L/ha) also differed from the other treatments (FIG. 2).

When ANOVA was performed with factor 2 scores, a significant difference (F=164.95; p=0.0001) was observed between the treatments when evaluated together with the *Eleusine indica* control scores at 07, 14 and 21 DAA, for example, all treatments differed from the weeded control. Formulation 4 (4.0 L/ha) also differed from all treatments (FIG. 2).

Comparative Evaluation of the Results in Relation to the Species *Brachiaria decumbens, Eleusine indica* and *Commelina benghalensis*

According to results presented above, glyphosate in the control of *Eleusine indica* and *Commelina benghalensis*, it is possible to observe that the control means of both the Original Roundup, Roundup WG and Formulation 1 are very similar and do not differ from the unweeded control, which shows that the formulations obtained from the composition of the present invention show in terms of treatment correlation with the commercial products of the market.

However, it should be noted that at lower commercial application rates (see Table 14), the effects achieved are competitive, and even under certain conditions, higher than those of commercial products, which proves the effectiveness of the proper balancing of components of the composition of the invention.

In the same way, and in addition, the results indicate that Formulation 4 allowed higher controls and with statistical difference in relation to the Original Roundup and Roundup WG commercial standards, when used against both *Brachiaria decumbens* as well as against *Eleusine indica* e *Commelina benghalensis*.

In summary, multivariate analyses of the satisfactory results of pre-seeding desiccation have confirmed that the present invention is the result of the optimization of two variables (composition of different types of glyphosate salts and the balancing of surfactants and/or adjuvants in concentrations and proportions).

That is, the composition of the present invention resulted in statistical gains and differences in weed control performance, which have generally been resistant to glyphosate, such as (*Eleusine indica*) and (*Commelina benghalensis*), when compared to controls on commercial standards employed for comparative purposes in the tests carried out.

Such gains are highly significant indicating that the composition of the present invention may exhibit greater consistency of control when the same dose is applied or may require a lower dose so that a same level of control is achieved, particularly when Formulation 4 is employed of the composition of the present invention, with great agronomic and environmental advantages.

In contrast, the other Formulations are also satisfactory in both doses used when compared with the commercial product Roundup WG, confirming similar results when tested in the treatment against *Brachiaria decumbens*.

The invention claimed is:

1. A high-load herbicide composition, exhibiting high efficiency in the control of weeds and low toxicity to the environment and to humans, comprising:
    glyphosate as a mixture of glyphosate potassium salts in a concentration of 20 to 35% (w/w) and glyphosate monoisopropylamine (MIPA) in a concentration of 20 to 35% (w/w) in relation to the total weight of the composition;
    a surfactant system containing N,N-dodecyldimethylamine oxide in the concentration of 2 to 5% (w/w) in relation to the total weight of the composition, and 1, 2 ethane diol in the concentration of 0.1 to 2.00% (w/w) in relation to the total weight of the composition; and
    a complexing agent diethylene triamine pentacetic sodium salt in a concentration of 0.1 to 1.0% (w/w) in relation to the total weight of the composition,
    a diluent, and
    an antifoaming agent.

2. The herbicidal composition according to claim 1 wherein the antifoaming agent is selected from silicones and siloxanes.

3. The herbicidal composition according to claim 2 wherein the antifoaming agent consists of polydimethylsiloxanes and is in the proportion of 0.2 to 0.40% relative to the total weight of the composition.

4. The herbicidal composition according to claim 1 that is supplied ready for use for being dispensed into a tank for preparing an aqueous-mixture.

5. A herbicidal composition according to claim 1 that promotes faster penetration, absorption and translocation and improved action of glyphosate on plants thereby reducing herbicide losses from plant leaves exposed to rainwater 1 hour after the application.

6. The herbicidal composition according to claim 4, that exhibits an increase in the amount of herbicide absorbed in the leaves of weeds of from 21.82% to 48.24% compared to Roundup™ formulations.

7. The herbicidal composition according to claim 1, wherein mean values of shikimic acid present in the weeds 24 hours after application of the composition range from about 107,000 ng/g to 127,000 ng/g.

8. The herbicidal composition according to claim 1, wherein mean values of internal glyphosate contents present in the weeds 24 hours after application of the composition range from about 235 ng/g to about 301 ng/g.

9. The herbicidal composition according to claim 1, that is provided as a solid particulate product, a powder or a granular composition.

10. A process for preparing an herbicidal composition that comprises:
   glyphosate as a mixture of glyphosate potassium salts in a concentration of 20 to 35% (w/w) and glyphosate monoisopropylamine (MIPA) in a concentration of 20 to 35% (w/w) in relation to the total weight of the composition;
   a surfactant system containing N,N-dodecyldimethylamine oxide in the concentration of 2 to 5% (w/w) in relation to the total weight of the composition, and 1, 2 ethane diol in the concentration of 0.1 to 2.00% (w/w) in relation to the total weight of the composition; and
   a complexing agent diethylene triamine pentacetic sodium salt in a concentration of 0.1 to 1.0% (w/w) in relation to the total weight of the composition,
   a diluent, and
   an antifoaming agent;
   the steps of the method comprising:
   (a) adding to a reactor/homogenizer tank 90% of the-diluent;
   (b) adding a potassium hydroxide solution and slowly adding the glyphosate (as acid), controlling the temperature at the maximum of 40° C.;
   (c) slowly adding isopropylamine, controlling the temperature at the maximum of 40° C. and stirring until complete reaction, maintaining the pH in the range 4.8 to 5.5;
   (d) adding the antifoaming agent; the surfactant system and remaining diluent and stirring to obtain a completely homogenized composition product; and
   (e) packaging the product.

11. The herbicide composition according to claim 1 that contains 20 to 25% w/w glyphosate potassium salt, 25 to 35% w/w glyphosate MIPA salt, 3.0 to 5% w/w N,N-dimethyldodecylamine oxide, 0.5 to 2.0% w/w 1,2-ethane diol, 0.01 to 1.0% w/w diethylene triamine pentacetic sodium salt, and wherein the antifoaming agent is 0.2 to 0.40% w/w dimethyl siloxane and the diluent is 31.6 to 51.6% w/w of water.

12. The herbicide composition according to claim 1 that contains 20 to 25% w/w glyphosate potassium salt, 25 to 35% w/w glyphosate salt with isopropylamine MIPA salt, 2.0 to 3.0% w/w of N,N-dimethyldodecylamine oxide, 0.1 to 0.8% w/w of 1,2-ethane diol, and wherein the antifoaming agent is 0.2 to 0.40% w/w dimethyl siloxane and the diluent is 32.3 to 51.8% w/w of water and further comprising 1.0 to 2.6% w/w of (carboxymethyl)dimethyl-3-((1-oxododecyl)amino) propylammonium hydroxide.

13. The herbicide composition according to claim 1 that contains 20 to 25% w/w glyphosate potassium salt, 25 to 35% w/w glyphosate MIPA salt, 2.5 to 4.5% w/w of N,N-dimethyldodecylamine oxide, 0.1 to 0.8% w/w of 1,2-ethane diol, 1.0 to 2.6% w/w of ethanolamine, wherein the antifoaming agent is 0.2 to 0.4% m/m of dimethyl siloxane and the diluent is 30.8 to 50.4% w/w of water.

14. The herbicide composition according to claim 1 that contains 25 to 35% w/w glyphosate potassium salt, 20 to 25% w/w glyphosate MIPA salt, 3.0 to 5% w/w N,N-dimethyldodecylamine oxide, 0.5 to 2.0% w/w 1,2-ethane diol, 0.01 to 1.0% w/w diethylene triamine pentacetic sodium salt, and wherein the antifoaming agent is 0.2 to 0.40% w/w dimethyl siloxane and the diluent is 31.6 to 51.6% w/w of water.

15. The herbicide composition according to claim 1 that contains 25 to 35% w/w glyphosate potassium salt, 20 to 25% w/w glyphosate MIPA salt, 2.0 to 3.0% w/w of N,N-dimethyldodecylamine oxide, 0.1 to 0.8% w/w of 1,2-ethane diol, and wherein the antifoaming agent is 0.2 to 0.40% w/w dimethyl siloxane and the diluent is 32.3 to 51.8% w/w of water and further comprising 1.0 to 2.6% w/w of (carboxymethyl)dimethyl-3-((1-oxododecyl)amino) propylammonium.

16. The herbicide composition according to claim 1 that contains 25 to 35% w/w glyphosate potassium salt, 20 to 25% w/w glyphosate MIPA salt, 2.5 to 4.5% w/w of N,N-dimethyldodecylamine oxide, 0.1 to 0.8% w/w of 1,2-ethane diol, 1.0 to 2.6% w/w of ethanolamine, and wherein the antifoaming agent is 0.2 to 0.4% m/m of dimethyl siloxane and the diluent 30.8 to 50.4% w/w of water.

17. A method for controlling weeds in various crops, comprising applying the herbicide composition according to claim 1 to the crop.

18. The method of claim 17, that comprises: a) diluting in an appropriate volume of water an herbicidally effective amount of the herbicide composition to prepare an application of the herbicide mixture, and b) applying the application of the herbicide mixture to the weed leaves.

19. The method according to claim 17, wherein the weed is of the family Poaceae, of the genus *Brachiaria*, the species *Brachiaria decumbens* the species *Eleusine indica*, and/or the species *Comelinea benghalensis*.

20. The herbicidal composition of claim 1, that further comprises an additional surfactant.

21. The herbicidal composition according to claim 2 that is supplied ready for use for being dispensed into a tank for preparing an aqueous mixture.

22. The herbicidal composition according to claim 3 that is supplied ready for use for being dispensed into a tank for preparing an aqueous mixture.

23. The herbicidal composition of claim 9, that is provided as dispersible granules.

* * * * *